United States Patent

[11] 3,534,677

| [72] | Inventor | Maurice F. Keathley<br>1150 Audubon Drive, Memphis, Tennessee 38117 |
|---|---|---|
| [21] | Appl. No. | 772,755 |
| [22] | Filed | Nov. 1, 1968 |
| [45] | Patented | Oct. 20, 1970 |

[54] FRYING BASKET
4 Claims, 7 Drawing Figs.

[52] U.S. Cl. .................................................. 99/411,
99/448, 99/450
[51] Int. Cl. ..................................................... A47j 37/12
[50] Field of Search............................................ 99/411,
403, 410, 414, 415, 416, 417, 426, 448, 450;
220/23, 83, 94

[56] References Cited
UNITED STATES PATENTS

| 519,580 | 5/1894 | Kelsey............................ | 99/448 |
| 1,025,630 | 5/1912 | Von Krogoll.................. | 99/410 |
| 2,138,967 | 12/1938 | Harris............................ | 99/416X |
| 2,652,768 | 9/1953 | Moreno.......................... | 99/448X |
| 3,207,059 | 9/1965 | Hirons.......................... | 99/450X |
| 3,217,633 | 11/1965 | Anetsberger.................. | 99/411X |
| 3,431,834 | 3/1969 | Keathley et al................ | 99/411X |

Primary Examiner—William I. Price
Assistant Examiner—Arthur O. Henderson
Attorney—John R. Walker, III ABSTRACT: A basket for deep fat fry cooking small food items such as fried pies, the basket having a generally rectangular body formed substantially of perforated or foraminous panels. The basket body defines a plurality of horizontally extending vertically arranged cooking chambers with each cooking chamber being adapted to receive a plurality of food items and to hold the food items in a submerged disposition in the cooking fat during cooking of the food items. The basket includes handle means for manipulation of the basket body into and out of the interior of the cooking vat and provides handle means for dispensing or discharging the cooked food items onto a table surface or the like after cooking the food items. The basket includes hook means adapted to engage the upper rim portion of the cooking vat for supporting the basket body in an elevated disposition over the cooking fat surface for draining the excess liquid fat from the cooked food items.

Patented Oct. 20, 1970
3,534,677
Sheet 1 of 2
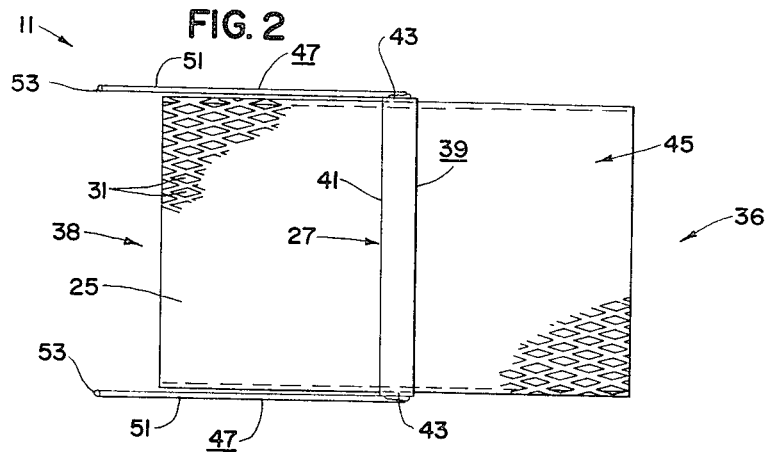
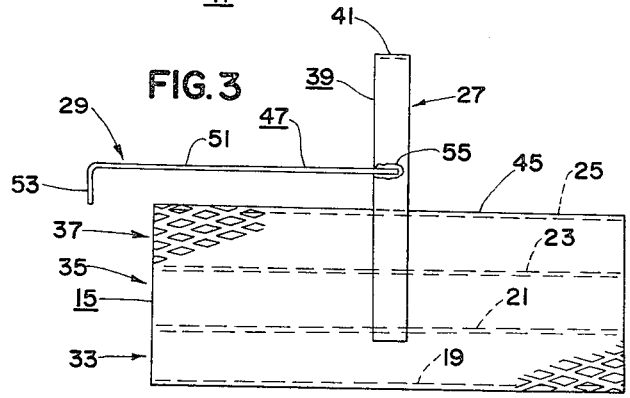
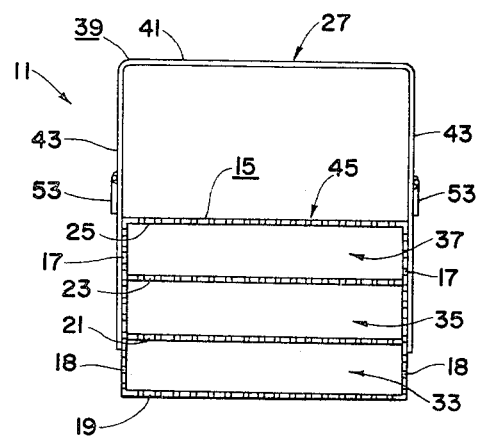
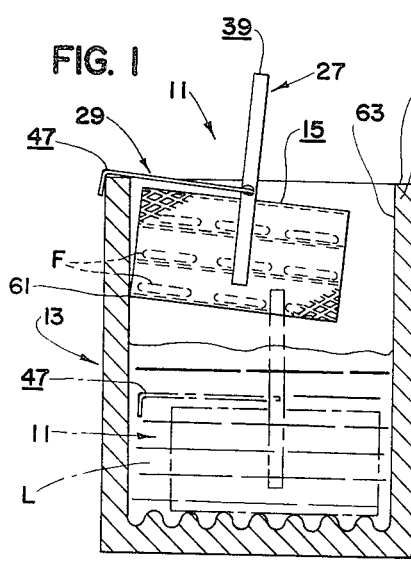
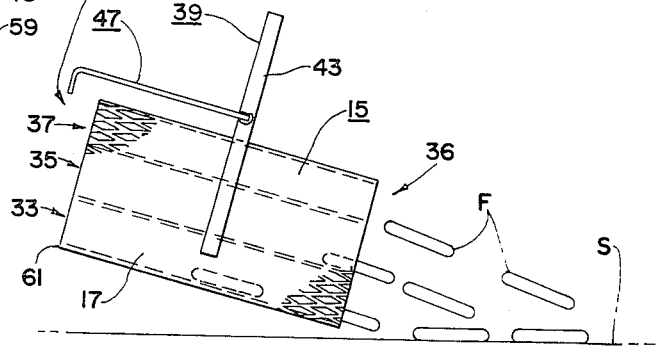
INVENTOR.
MAURICE F. KEATHLEY
BY John R. Walker, III
Attorney

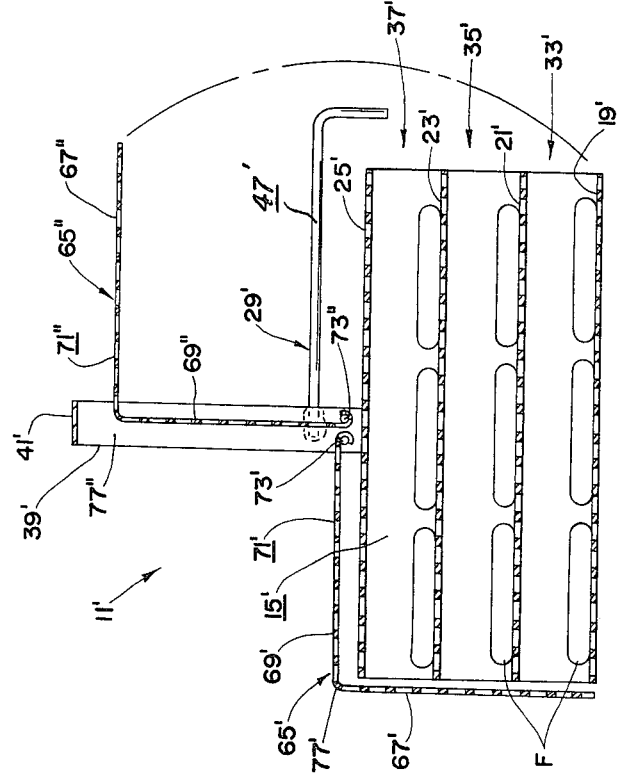
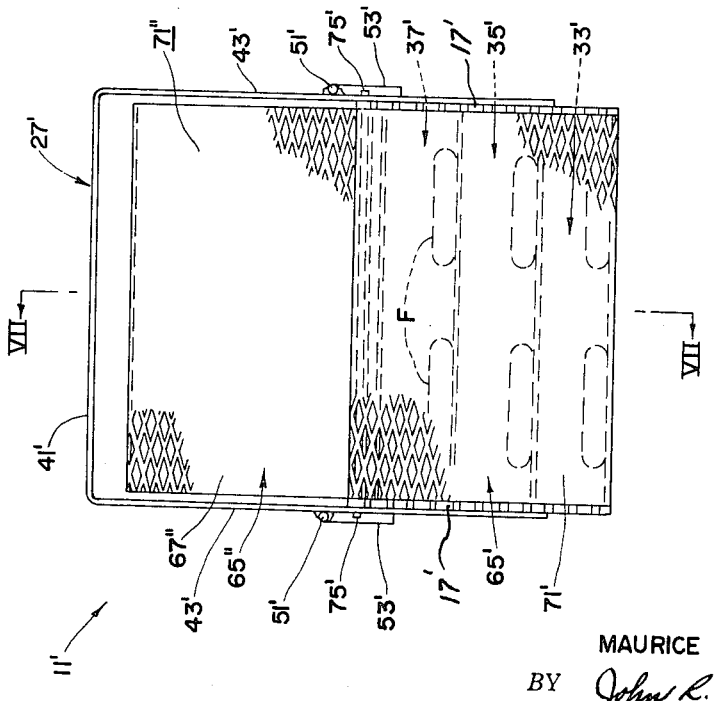

FRYING BASKET

BACKGROUND OF THE INVENTION

1. Field of the Invention

The invention relates to deep fat fry cooking apparatus generally and relates particularly to deep fat fry cooking apparatus and procedures utilized in cooking fried pies or the like in short order restaurants, self service grills or the like. The invention particularly relates to the fry basket structure of a deep fat frying apparatus and such basket structure adapted to be utilized with a typical deep fat frying vat.

2. Description of the Prior Art

In short order restaurants, grills or the like, the general practice in deep-fat-fry cooking small food items generally may include the following actions: the food items are placed in a simple open-topped handheld basket; the basket is submerged in the vat of hot cooking grease; after the food items are cooked, the basket is raised and suspended over the vat for draining the food items; after the food items are drained, the basket is removed from the vat and the food items dumped on a table surface or receptacle. When cooking onion rings, french fried potatoes, or other such heavy food items the open-topped baskets may work rather well; however, when the food items are fried pies or other such items that tend to float in the hot fat, the open-topped basket does not perform properly. When the pies are dumped in the open-topped basket, they tend to float and are not uniformly cooked in a submerged disposition in the cooking fat. Moreover, the pies, when contained in a simple fry basket, tend to bunch together and are not uniformly cooked. Also, fried pies or other like pastry items are rather fragile and tend to be easily damaged in manipulating the basket in the cooking fat or in dumping the pies from the basket. Also, the number of pies or pastry items that may be cooked in one batch is substantially limited since in a simple fry basket only a relatively small number of pies may be supported in the bottom of the basket.

SUMMARY OF THE INVENTION

The present invention is particularly useful for cooking fried pies or other such delicate or easily damaged pastry items. The fry basket of the present invention includes a plurality of longitudinally extended, vertically arranged tiers of cooking chambers with each cooking chamber adapted to contain a plurality of pies or other like food items. The plurality of cooking chambers in the fry basket of the present invention is adapted for holding the pies in a submerged disposition in a cooking vat and for constraining the pies loosely and separated in vertical tierlike arrangement; the loosely arranged pies permit the free circulation of the hot cooking fat throughout the plurality of pies and promotes uniform cooking of each pie of a batch of pies. The fry basket of the present invention may be of such size and construction as to cook 18 or more pies in one cooking batch of pies. After cooking a batch of pies, the fry basket may be readily lifted from the vat and tilted to discharge or eject the cooked pies onto a table surface or the like while they are still hot, whereas with previous baskets it was necessary for the pies to be cooled before discharging. Thus, time is saved with the use of the present invention and at the same time the quality of the product is maintained. A modified form of the fry basket of the present invention includes a pair of liftable, apertured gate members adapted for arrangement respectively over the opposite open end portions of the plurality of cooking chambers. The pies may be dispensed or ejected from the cooking chambers by lifting one of the pivotally supported, apertured gate panels and then tilting the basket thereby discharging the pies from the cooking chambers onto a table surface or a container.

In summary, the basket of the present invention provides a basket which is convenient, which saves time and which maintains the quality of the product.

BRIEF DESCRIPTION OF THE DRAWINGS

FIG. 1 is a side elevational view of one embodiment of the fry basket of the present invention shown in conjunction with a typical deep fat fry cooking vat (the vat being shown in cross section) and illustrating the frying basket arranged in an elevated disposition in the cooking vat.

FIG. 2 is a top view of the embodiment of the frying basket shown in FIG. 1.

FIG. 3 is a side elevational view of the basket.

FIG. 4 is an end elevational view of the frying basket.

FIG. 5 is a side elevational view of of the basket as being manipulated in ejecting the food items from the basket.

FIG. 6 is an end elevational view of a second embodiment of the present invention having a pair of pivotally supported gate members operative respectively for movement across the opposite end openings of the plurality of cooking chambers.

FIG. 7 is a longitudinal cross-sectional view of the cooking basket taken as on the line VII–VII of FIG. 6.

DESCRIPTION OF THE PREFERRED EMBODIMENTS

FIGS. 1–5 illustrate a first embodiment of the frying basket of the present invention. The basket is illustrated by numeral 11 and is adapted to be arranged generally in three dispositions: (1) frying basket 11 is adapted to be loaded with a batch of food items F and submerged in the hot cooking fat of cooking vat 13 (see broken line showing in FIG. 1); (2) after food items F are cooked, basket 11 is raised from the cooking fat liquid L and elevatingly supported in cooking vat 13 for draining the excess liquid fat from the food items (see full line showing in FIG. 1); (3) after the liquid fat has drained from the food items and preferably while the pies are still hot, basket 11 is removed from vat 13 and tilted over a table surface S thereby permitting the food items to slide from the basket onto the cooking surface (see FIG. 5).

Fry basket 11 includes a generally rectangular body 15 formed substantially of vertical side panels 17, 17; horizontal tier panels 19, 21, 23, 25; handle means 27 adapted for manipulation of basket body 15; and hook means 29 adapted for elevatingly supporting the basket body in cooking vat 13 in draining the cooking items.

Body 15 including side panels 17, 17 and tier panels 19, 21, 23, 25 preferably is formed of foraminous material as flattened expanded metal mesh material and with each panel having a multiplicity of uniformly arranged diamond-shaped apertures, as apertures 31 in tier panel 25 (see FIG. 2). It will be understood that the showing of the expanded metal in detail in only portions of the basket is for illustrative purposes only and that actually the expanded metal extends all the way across the panels. The parallel arranged, apertured side panels 17, 17 and the vertically spaced apart horizontally extending tier panels 19, 21, 23, 25 define fore and aft extending vertically spaced cooking chambers 33, 35, 37. Each cooking chamber is defined by horizontally confronting portions of pair of side panels 17, 17 and a respective pair of tier panels 19, 21, 23, 25. For example, cooking chamber 33 is defined by confronting lower sectional portions 18, 18 of vertical side panels 17, 17 and by vertically confronting tier panels 19, 21. Cooking chambers 33, 35, 37 extend respectively longitudinally in body 15 and open oppositely respectively in forward and rearward ends 36, 38 of the basket body; each cooking chamber 33, 35, 37 defines substantially a straight-open passageway extending fore and aft through the basket body.

Handle means 27 preferably includes a generally inverted U-shaped support 39 including a handgrip portion 41 and a pair of leg portions 43, 43. U-shaped support 39 is fixedly supported on the medial upper portion of basket body 15 with leg portions 43, 43 being fixedly secured along outside surfaces respectively of side panels 17, 17. U-shaped support 39 projects vertically perpendicularly upwardly from the horizontally planar upper area 45 of body 15 and is arranged with handgrip portion 41 extending laterally of the basket body and arranged at a substantial distance above the upper area of the body.

Hook means 29 preferably includes a pair of parallel arranged hook members 47, 47 supported respectively on and projecting rearwardly cantilever fashion from leg portions 43, 43 of handle means support 39.

Hook members 47, 47 are adapted to engage rim portion 49 of the vat 13 or other supporting structure, such as rods or the like, and to support the cooking basket in an elevated disposition while draining food items F (see full line showing of basket in FIG. 1). Hook members 47, 47 each are preferably generally L-shaped and include a shank portion 51 and catch portion 53 arranged in right angular relation. Hook members 47, 47 preferably are fixedly secured on leg portions 43, 43 by weld beads 55, 55 with shank portions 51, 51 extending parallel rearwardly of basket body 15 and catch portions 53, 53 projecting parallel downwardly and arranged upwardly and outwardly of rearward end 38 of the basket body. Basket 11 is adapted to be supported cantilever fashion within the interior of vat 13 with shank and catch portion 51, 53 respectively of hook members 47, 47 engaging horizontal and vertical surfaces 57, 59 of vat rim portion 49. When elevatingly supported in vat 13, lower rearward edge 61 of body 15 is fulcrumed against inside surface 63 of the vat; the downwardly canted disposition of basket 11 permits ready draining of the excess liquid fat L from food items F.

A second embodiment of the invention is illustrated in FIGS. 6 and 7 illustrating a frying basket 11' which differs from basket 11 in that it includes forward and rearward gate means 65', 65''. Except for forward and rearward gate means 65', 65'', basket 11' is constructed in like manner as basket 11 and includes a body 15' formed of side panels 17', 17' and tier panels 19', 21', 23', 25', handle means 27' and hook means 29'. Side panels 17', 17' and tier panels 19', 21', 23'25', define respectively longitudinally open cooking chambers 33', 35', 37' each being adapted to hold a plurality of food items F. Handle means 27' includes an inverted U-shaped support 39' including a handgrip portion 41' and leg portions 43', 43'. Hook means 29' includes a pair of hook members 47', 47' including respectively shank and catch portions 51', 53'.

Forward and rearward gate means 65', 65'' each are preferably alike and each include respectively a gate panel 67', 67'' and reach panel 69', 69''; right angularly secured together and forming respectively forward and rearward gate-reach elements 71', 71''. Pivot pin means including a forward and a rearward pivot shaft 73', 73'' pivotally support respectively gate-reach elements 71', 71'' from basket body 15' for pivotal movement respectively of forward and rearward gate panels 67', 67'' respectively over forward and rearward openings of cooking chamber 33', 35', 37'. Pivot shafts 73', 73'' preferably are fixedly secured along the proximal edge portions respectively of reach panels 69', 69'' and with opposite end portions 75' projecting oppositely through aligned apertures in leg portions 43', 43' of U-shaped support 39'.

Although the pivot means of gate-reach elements 71', 71'' are depicted as being pivotally supported on pivot shafts 73', 73'' which in turn are supported from leg portions 43', 43' of handle means 27', other suitable pivotal support means for gate-reach elements 71', 71'' may be utilized if desired without departing from the spirit and scope of the invention. Thus, it may be desirable in certain embodiments of the invention (not shown) to pivotally secure gate-reach elements 71', 71' superjacently on the medial portion of basket body 15' by pivot bearing means other than by the pivot bearing means supported on handle leg portions 43', 43'. Also, in certain embodiments of the invention (not shown) reach panels 69', 69'' respectively of reach gate elements 71', 71'' may be of other form than the expanded metal mesh form illustrated in FIGS. 6 and 7. Since reach panels 69', 69'' preferably serve substantially only as rigid reach structure interconnecting gate panel proximal edge portions 77', 77'' with pivot shafts 73, 73''', many other forms of rigid reach structure may be utilized in gate-reach elements 71', 71'' without departing from the spirit and scope of the invention.

FIG. 7 illustrates basket 11' with forward gate-reach element 71' in a downwardly arranged disposition with foraminous gate panel 67' arranged across the forward openings of cooking chambers 33', 35', 37. FIG. 7 illustrates also rearward gate-reach elements 71'' in a raised disposition and with rearward gate panel 67'' being pivotally displaced upwardly from across the rearward openings of cooking chambers 33', 35', 37'. Forward and rearward gate-reach elements 71', 71'' are gravitatingly pivotally urged downwardly to positions respectively across oppositely open ends of cooking chambers 33', 35', 37'. Forward and rearward gate elements 67', 67'' each are adapted to be selectively pivotally raised by hand for ejecting or discharging the food items from the cooking chambers.

I claim:

1. A frying basket for fry cooking a batch of food items in hot liquid fat contained in a cooking vat having supporting means adjacent the upper edge of said vat, the cooking basket comprising a body generally rectangular in configuration having a forward end and a rearward end and including a pair of spaced vertical side panels and a plurality of horizontally arranged and vertically spaced apart foraminous tier panels fixedly supported in and arranged between said pair of side panels and defining a plurality of horizontally fore and aft extending vertically spaced cooking chambers with each cooking chamber being defined by directly confronting portions of said pair of side panels and a vertically adjacent confronting pair of tier panels, each cooking chamber of said basket body extending longitudinally fore and aft in said body and being open at least at one of the ends thereof, each cooking chamber being adapted to hold at least one food item in a submerged condition in the vat cooking fat, handle means fixed superjacently on said body for manipulation of said body into and out of the vat interior, and hook means for supporting said body from said supporting means and in an elevated disposition in the vat interior; said foraminous horizontally arranged tier panels each being formed of flattened expanded metal mesh and formed with a multiplicity of uniformly arranged diamond-shaped apertures; said handle means including a generally inverted U-shaped support arranged superjacently medially of the basket body and including a horizontal handgrip portion and a pair of leg portions parallel arranged and projecting downwardly from respectively opposite end portions of said handgrip portion and with said leg portions being fixedly secured respectively on opposite side panels of said basket body and projecting vertically and perpendicularly from the basket body; said hook means including a pair of hook members fixedly supported respectively on and projecting rearwardly cantilever fashion from the leg portions of said U-shaped support, each hook member including a horizontal shank portion fixedly secured at one end thereof to a respective leg portion of said U-shaped support and including a catch portion formed on and projecting downwardly from the distal end portion of said shank portion, said pair of hook members being parallel arranged and in lateral horizontal alignment relative to said basket body, said pair of hook members being operative with said shank and said catch portions thereof simultaneously coactingly engaging respectively the top and outside surfaces of the rim portion of said cooking vat.

2. A frying basket for fry cooking a batch of food items in hot liquid fat contained in a cooking vat having supporting means adjacent the upper edge of said vat, the cooking basket comprising a body generally rectangular in configuration having a forward end and a rearward end and including a pair of spaced vertical side panels and a plurality of horizontally arranged and vertically spaced apart foraminous tier panels fixedly supported in and arranged between said pair of side panels and defining a plurality of horizontally fore and aft extending vertically spaced cooking chambers with each cooking chamber being defined by directly confronting portions of said pair of side panels and a vertically adjacent confronting pair of tier panels, each cooking chamber of said basket body extending longitudinally fore and aft in said body and being open at least at one of the ends thereof, each cooking chamber being adapted to hold at least one food item in a submerged condition in the vat cooking fat, handle means fixed superjacently on said body for manipulation of said body into and out of the vat interior, and hook means for supporting said body from said supporting means and in an elevated disposition in the vat interior; including a forward, generally planar, thin foraminous gate panel having a horizontally extending proximal edge, forward pivot means pivotally supporting said forward gate panel from said basket body for movement between a vertical first position whereat said forward gate panel is arranged simultaneously across the forward end openings of said plurality of cooking chambers and a second position whereat said forward gate panel is arranged remote from the forward end opening of said plurality of cooking chambers, a rearward, generally planar, thin foraminous gate panel having a horizontally extending proximal edge, rearward pivot means pivotally supporting said rearward gate panel from said basket body for movement between a vertical first position whereat said rearward gate panel is arranged simultaneously across the rearward end opening of said plurality of cooking chambers and a second position whereat said rearward gate panel is arranged remote from the rearward end openings of said plurality of cooking chambers.

3. The frying basket of claim 2 wherein said forward pivot means pivotally supporting said forward gate panel includes generally planar forward reach structure rigidly connected in right angular relationship along a distal edge portion thereof with the proximal edge portion of said forward gate panel and includes forward pivot pin means pivotally connecting the proximal edge portion of said forward reach structure on the upper medial portion of said basket body, and wherein said rearward pivot means pivotally supporting said rearward gate panel includes generally planar rearward reach structure rigidly connected in right angular relationship along a distal edge portion thereof with the proximal edge portion of said rearward gate panel and includes rearward pivot pin means pivotally connecting the proximal edge portion of said rearward reach structure on the upper medial portion of said basket body, said forward and rearward gate panels each being adapted to be selectively pivotally arranged by hand respectively to said second positions or hand released thereby gravitatingly permitting pivotal movement of said gate panels to first positions.

4. The frying basket of claim 3 wherein said basket body including said side panels and tier panels, and said gate panels are formed substantially entirely of flattened expanded metal mesh and with each panel being formed with a multiplicity of uniformly arranged diamond-shaped apertures.